Patented Feb. 28, 1939

2,148,832

UNITED STATES PATENT OFFICE 2,148,832

MANUFACTURE OF IMPROVED RUBBER CHLORIDE AND LIKE COMPOSITIONS

James Wallace Raynolds, Nitro, W. Va., assignor to The Raolin Corporation, Charleston, W. Va., a corporation of West Virginia No Drawing. Application March 17, 1936, Serial No. 69,415

5 Claims. (Cl. 260—111)

This invention relates to rubber chloride; and it comprises a method of rendering rubber chloride compositions more resistant to moisture and aqueous liquids wherein haze-forming and solid phase impurities are removed from a dry rubber chloride solution in a non-aqueous solvent, the solution being warmed with a dry, finely divided, adsorbent solid material in sufficient quantity to collect and hold fine particles of solid phase impurities natural to rubber and then clarifying the mixture by filtration or centrifugal action to remove the added material and the collected matter and give a bright, haze-free liquid; and it also comprises as a new composition of matter, the improved rubber chloride freed of haze-forming impurities of the character of those occurring in rubber and capable of dissolving in non-aqueous solvents to a non-hazy and bright, light colored solution and yielding films or coatings resistant to local attack by water and aqueous solutions; all as more fully hereinafter set forth and as claimed.

Rubber chloride carrying 64 to 66 per cent chlorine is a substance which has been known for very many years and is of greater potential than actual interest, as an intermediate in making lacquers or varnishes. Its properties are unique. As a pure material, it is non-inflammable, it is stable against deterioration, is inert chemically and is wholly unaffected by most liquids, including aqueous solutions of acids, alkalies and salts, alcohols, etc. An important property is its indifference to aliphatic (petroleum) hydrocarbons. It is soluble in but few liquids and is not indefinitely miscible with all of these.

Rubber chloride is, however, brittle and friable and its limited miscibility renders the production of good, uniform, stable compositions a matter of serious difficulty. Further, rubber chloride is not thermoplastic, being infusible and charrying at temperatures of about 150° C. Consequently, it cannot be directly converted into protective films or coatings or into shaped articles. Collateral means are necessary to render it plastic or liquid; that is, shapable.

Pure rubber chloride itself, as a chemical entity, is not in any way affected by moisture or aqueous solutions. But commercial rubber chloride products always contain certain solid phase impurities which are a carry-over from the raw rubber used in its production, in addition to by-products formed during chlorination. These are hygroscopic, in the sense that they tend to take up moisture and form localized attackable spots. The rubber substance itself, that is pure caoutchouc, is a hydrocarbon and is not hygroscopic; it has no affinity for moisture.

Rubber chloride made from reasonably pure caoutchouc carries the stated high percentage of chlorine, 64 to 66 per cent, and it is this material which is extremely stable and highly resistant to air, moisture and ageing. Other circumstances being equal, the lower the chlorine content the less the stability. With low grade rubbers, it is not practicable to make a product with this high chlorine content, nor a preparation which is entirely stable. In a general way, stability and high chlorine content go together. In the present invention, rubber chloride made from a pure rubber is contemplated.

As is well recognized, the best of commercial rubber contains a certain amount of foreign matter derived from the latex, such as proteids, carbohydrates, resinous matter, etc., some being water-soluble. On oxidation by long exposure to air the amount of resinous matter may increase substantially. In clean raw rubber, the actual amount of foreign materials is minute; the amount of proteid, for instance, being merely above 4 per cent. Nevertheless, these impurities largely condition the properties of the rubber, since they exist in such form as to give structure; probably being distributed in filmiform intervening layers, forming what may be called "bounded phases". Because of this foreign matter, raw rubber, and to a less extent vulcanized rubber, will take up considerable amounts of moisture on long submergence. The presence of this foreign matter in rubber chloride is quite undesirable.

I have found that these solid phase impurities must be removed to make rubber chloride films or articles showing no local, spot-wise attack by aqueous liquids. In their presence, rubber chloride varnishes cannot be made wholly protective, since the spots offer avenues for the access of corrosive agents to the underlying metal.

In the present invention, this foreign matter is removed while the rubber chloride is in solution in a substantially dry, non-aqueous solvent. The impurities seem to be intimately associated in some way with the rubber chloride and are, moreover, quite fine. They disperse readily in rubber chloride solutions as colloidal suspensions of extreme fineness. It is hardly practicable to remove them by direct filtration, but I have found that by warming the solutions in the presence of a finely divided adsorbing solid material insoluble in the liquid, the impurities are collected and put in such form that their removal, together with added solid matter, becomes practicable. In detail, I add to the liquid a substantially dry, finely divided adsorbent material in amount rather large as compared with the total amount of impurities. The amount is, however, rather small as compared with the liquid or the rubber chloride. The mixture is warmed and stirred for a time, to put the impurities into removable condition, and the liquid is then clarified, removing the added material and that collected by it. Advantageously, the warm liquid is filtered under suitable pressure in filter presses having the filter cloths precoated with a "filter aid", such as the diatomaceous earth preparation known as "Hi-Flo". A separation may, however, be effected by centrifuging. The results can be followed by visual inspection, more or less. The initial solution is quite turbid, hazy and rather dark in color, the sheer amount of turbidity depending somewhat upon the raw rubber chlorinated. In all cases, there is enough haze to give a marked Tyndall effect after ordinary settling, centrifuging, etc. Clarified solutions obtained in the present invention are bright, light colored liquids giving substantially no Tyndall effect, provided the adsorbent is of proper character and used in the proper amount. Otherwise, there may be a secondary Tyndall effect, due to dispersed adsorbent. Adsorbents in very fine particles are not desirable and the heating and stirring should not be long or more energetic than is required to give a removable material. With some of these adsorbents, it is possible to stir them into a rather permanent dispersion.

The whole system should be substantially dry at the time removal is effected. The impurities as they occur in rubber are of a more or less hydrated and swollen character and they do not separate well unless desiccated. Drying the liquid and the included solids, in suspension, is an important feature of the present invention.

As a matter of practice, I find it advantageous to employ powdered solids which are capable of absorbing, adsorbing or fixing any small residual amounts of $H_2O$ which may accidentally enter the system or avoid removal during drying, although these are seldom encountered. Naturally, the added agent should itself be dry; it should be free of either chemically combined or loosely combined water. It is advantageous to dry or dehydrate the treating agent before use.

Commercial decolorizing carbons, such as "Eponite", have high adsorptive power and are usually quite fine. If these carbons are preliminarily dried, they are effective agents for collecting and holding the impurities of rubber chloride. Very fine adsorptive agents, such as some commercial decolorizing carbons, can be used with advantage by the expedient of also using a filter aid, added simultaneously or afterwards. Mixtures of treating agents of this character are often quite desirable. The quantity of carbon required for efficient removal of impurity varies with the amount of impurity, but generally about 1 per cent on the rubber chloride in the solution is used. Sometimes, the amount used is as low as 0.5 per cent and sometimes as high as 5 per cent. In lieu of decolorizing carbon, dried, commercial charcoal, boneblack, fuller's earth, etc., may be used with fair results. The decolorizing carbons, or other inert adsorbents employed to collect the desiccated haze-forming impurities have an additional function, since they not only collect insoluble bodies, but remove color-giving impurities and bodies derived from resins which may be in solution. Many adsorbents are more or less effective in collecting the very fine proteid particles derived from the rubber; these proteid particles being responsible for much of the haze; but in general I find finely divided decolorizing carbons, such as the "Eponite" previously mentioned, superior to other adsorbents in this respect.

Heating the mixture facilitates the actions and assists in dehydration and in precipitation of impurities. When unusually large amounts of moisture are present, as, for instance, when a moist solvent or moist rubber chloride is used, heating the solution removes the water; the water going forward with some of the solvent as a low boiling azeotropic mixture. In the heat, the liquids are much more mobile and this facilitates operation. Ordinarily, temperatures between 30° C. and 90° C. are used and in this range of temperature, with the usual amount of treating agent, stirring for a time between 30 and 240 minutes is usually sufficient. Filter pressing of the hot solution is ordinarily at a pressure of about 10 to 20 pounds per square inch.

In commercial practice, removal of haze and turbidity, that is freeing the rubber chloride of hygroscopic impurities, may be applied at any stage in the operation, including the stage of making the rubber chloride. This is usually done by chlorinating a solution of rubber in carbon tetrachloride or the like. The resulting chlorinated liquid may be clarified in the way described. Or, the operation may be performed after the rubber chloride is made into a varnish base or varnish. The method can be applied to the improvement of the rubber chloride products and compositions commercially available. In making varnishes with rubber chloride, it is customary to use aromatic hydrocarbons, that is, coal tar oils, as solvents and thinners. The maximum strength of a solution which can be conveniently handled with toluol is about 33 per cent rubber chloride; a 1:2 ratio by weight of rubber chloride and solvent.

Such a liquid can be diluted with more toluol to form a liquid coating composition or varnish which will dry down to give rubber chloride in films which have a pleasing appearance, gloss, resistance, etc. The coating is however brittle and otherwise unsatisfactory from a practical point of view. It is therefore customary to add, either to the varnish or the varnish base, some sort of plasticizer. Such compounded varnishes yield mixed films which are less brittle. However, I have found that with such additions new difficulties arise. The ordinary plasticizers are often non-solvents, or not very effective solvents, for rubber chloride and their presence accentuates the difficulties due to the presence of haze-forming solids. The plasticizers may segregate the impurities and localize them in the final film. The haze-forming impurities are generally not so injurious in the absence of plasticizers and blending agents as in their presence. But the use of plasticizers and blending agents is practically necessary in obtaining films which are not brittle.

In making varnishes, it is advantageous to use the collecting method with the varnish base prior to the addition of plasticizers and blending agents. While a varnish base, such as the 33 per cent toluol solution mentioned, is ordinarily quite viscous, it is not sufficiently so to prevent clarification. After clarification, the usual blending agents, plasticizers, thinners, etc., may be added. It is, however, of course possible and somewhat easier in operation to thin the varnish base with a volatile solvent prior to clarification.

The present procedures are applicable to clear varnishes. Varnishes containing pigments and fillers should first be treated to remove these bodies. Pigments and fillers may be afterwards compounded with a clarified varnish or varnish base.

Commercial dry rubber chloride is a granular powder or bulky material of the so-called "popcorn" type. This is dissolved in any suitable solvent, such as carbon tetrachloride, chloroform, toluol, or "solvent naphtha" (commercial mixtures of coal tar hydrocarbons) and the solution is then clarified. The clarified liquid may then have the solvent removed by evaporation or otherwise, to re-obtain solid rubber chloride. Or, if the solution is in a varnish solvent, it may be directly used.

As stated, the haze-forming bodies may be removed at any stage in manufacture and it is even practicable to remove them from the rubber itself prior to making rubber chloride. For example, it is possible to clarify a solution of rubber in carbon tetrachloride prior to chlorination. There is some advantage in this procedure, since with the foreign non-rubber bodies removed, chlorination with production of a pure rubber chloride becomes easier and there is less formation of byproducts. Rubber may also be clarified as described hereinabove prior to making other rubber derivatives than rubber chloride. Or, the rubber may be recovered from the solution as such, and is a desirable material for insulating and other purposes, because of the absence of hygroscopic impurities. As stated, ordinary rubber does not withstand submerging in water and this militates against its use in insulation. The purified rubber is much less susceptible to the action of moisture. My invention as applied to the treatment of rubber solutions prior to the preparation of rubber chloride or other products therefrom is described in more detail and claimed in my application, Serial No. 200,536, filed April 6, 1938.

In the ordinary routine of the present invention, however, commercial rubber chloride as a commercial solution or in the dry form is used as the starting material. The dried chloride is brought into solution in a suitable non-aqueous solvent and clarified. The commercial solution may be thinned somewhat and then clarified.

In all embodiments of my process involving the manufacture of varnish bases and varnish, as well as plastic materials, it is advantageous to use in the varnish what may be called a balanced solvent; a correlated mixture of volatile solvents and relatively high boiling solvents, such as is described in my copending application, Serial No. 69,416. In so operating, the solvent with the rubber chloride used in the clarifying operation may be part of a balanced solvent mixture appearing in the final varnish. Or, in making plastic materials, much of the solvent may be removed after clarification, thereby producing viscous or thermoplastic compositions which may be applied to various articles by spraying, roller coating or calendering procedures. In making the varnishes, the clarified liquid is mixed with enough volatile thinner to obtain liquid coating compositions of a viscosity appropriate for application by spraying or brushing, as the case may be. The present haze-removing operation may be applied to various solvated rubber chloride compositions made according to methods of my copending application, Serial No. 69,416.

In connection with the present invention, I have developed certain tests for ascertaining visually the presence of hygroscopic bodies. One such test is a simple immersion of a dried rubber chloride film in water; this often developing blistering or fogging due to local absorption of water by the hygroscopic bodies. A more effective accelerated test is to apply and dry, unplasticized rubber chloride coatings on aluminum sheets or wires and immerse in an aqueous salt solution at the boiling temperature. In the presence of hygroscopic spots of impurity, the salt solution penetrates the coatings and reaches the metal with development of blisters in the coating film. But with some compositions containing commercial plasticizers, such as tricresyl phosphate, mere immersion in water at room temperatures for a few hours is sufficient to develop defects. After a time, the immersed film becomes hazy or frosty and finally opaque. Some of this appearance is often due to the plasticizer itself and this is not usually very serious. The two effects may be readily distinguished. When the cloudiness of the immersed film is entirely due to the plasticizer, it develops at most a blue-white, more or less translucent haze. In the presence of hygroscopic spots of impurity, however, there appears a gray-white, frosty haze, rendering the film opaque. Dried films of rubber chloride purified by the present process, on glass, withstand both the cold water and the hot salt solution tests. In boiling salt solution, a film made from untreated rubber chloride rapidly blisters and ruptures, whereas in the same time, a similar film from the purified rubber chloride neither blisters nor ruptures.

Any film not withstanding the action of water or salt solution will not withstand the action of aqueous acids, alkalies, salts, etc.

I have noted that at times an addition of balanced solvent to the rubber chloride solution has a marked flocculating or precipitating action on the impurities and therefore facilitates collection and removal. Some of these solvents are themselves more or less hygroscopic and aid in fixing moisture in the system. While the described method is applicable to commercial rubber chloride and particularly when made from a good grade of rubber, I find that the best rubber chloride for the present purposes is that made in a particular way described and claimed in an application of one North, Serial No. 62,547, wherein rubber is chlorinated in a carbon tetrachloride or other solution at a minimum viscosity and in the absence of all moisture. This is not only freer of by-products, but the haze-forming impurities are in a physical form facilitating collection and removal; perhaps, because of their dehydration.

In a particular embodiment of the present invention using a thick solution of rubber chloride in toluol, about 1 per cent of commercial decolorizing carbon, Eponite, is added. The mixture is warmed to about 80° C. and stirred for about 2 hours. The liquid is then clarified by pumping it through a filter press, a pressure of about 10 to 20 pounds per square inch being ordinarily desirable. The filter cloth is precoated with a filter aid, such as the "Hi-Flo" mentioned. Sometimes, it is desirable to add a little of the filter aid to the stirred liquid just prior to filtering. In the event that stirring has been too vigorous or too long-continued, thereby sending some of the carbon into colloidal suspension, the addition of filter aid is quite advantageous.

Filtering while hot is also advantageous, especially with solutions of high solid contents.

As stated, plasticizers or blending agents, etc., may be added to the thick solution prior to clarification and they sometimes exercise an advantageous flocculating effect on suspended impurities.

In another embodiment of my invention utilizing "balanced solvent" principles, 35 parts by weight of commercial dry rubber chloride of the so-called "popcorn" type are dissolved in 200 parts of mixed solvents, the mixture being equal parts of toluol and xylol. Rapid solution is facilitated by warming and stirring. To the warm liquid is added 0.35 part of previously baked and dried commercial decolorizing carbon. The liquid is then clarified as before. The higher temperatures necessary for this mixture of solvents are desirable as facilitating dehydration or desiccation, the moisture passing forward as an azeotropic vapor mixture with some of the toluol. Distilled and condensed toluol may be recovered.

The clarified liquid with a small further addition of volatile solvent or thinner becomes a varnish useful for many purposes. Plasticizers may be added, an addition of 10 parts by weight of tricresyl phosphate being sometimes employed. With a liquid made as described, using tricresyl phosphate as the plasticizer, coatings may be made having good resistance to water. In comparative tests of films thus made with films made from unpurified rubber chloride, interesting results are obtained. In making the test, samples of compositions are flowed on glass plates, the plates dried at room temperature for 24 hours and then immersed in water at the ordinary temperature. Inspection of the coatings at intervals gives the following results:

| Time of immersion (days) | Treated composition | Untreated composition |
|---|---|---|
| 6 | Substantially clear | Entirely opaque. |
| 14 | do | Do. |
| 21 | do | Do. |

When the plasticizer is added to the clarified solution, no cloudiness develops, but clouding occurs with the untreated liquid. The results are better when the liquid is treated with decolorizing carbon prior to evaporation. Rubber chloride solutions which are simply filtered without the addition of collecting agents, when compounded with plasticizer as before, give solutions which in the same test become hazy after 6 days, badly hazed after 14 days and somewhat opaque after 21 days; results which are not as good as in the foregoing test on material treated with decolorizing carbon.

While I find it advantageous to use decolorizing carbon as part or all of the solid inert adsorbent matter used for collecting impurities, useful results may be obtained with other dried adsorptive powders which do not react with constituents of the solution: fuller's earth, for example, if well dried is fairly efficient in collecting fine haze.

A clarified rubber chloride solution made as described, may be compounded with other film-forming materials, pigments, etc. The rubber chloride solution is compatible with solutions of various synthetic resins, including the soluble forms of phenol-formaldehyde resins. For evident reasons, it is better not to add resinous bodies to the rubber chloride solution prior to clarification with the aid of adsorbents. In making composite varnishes, in most cases it is best to purify the rubber chloride first. However, there are some of these materials which, like the drying oils, permit the clarification after their addition.

The character of the dried film depends considerably upon the particular plasticizer used. It may be soft or hard, horny or leathery. In most cases, the plasticizer is either a liquid permanent in the air and having no great vapor tension or is a soft solid of similar properties. In either event, after removal of the solvent, a composition is left which is thermoplastic and adapted for use for plastic purposes; for roller coating purposes, etc. A certain amount of volatile solvent is necessary in obtaining a composition liquid enough to permit clarification, as for instance, 2 parts of toluol to 1 part of rubber chloride; but this solvent must afterwards be removed, in whole or in part, in making thermoplastic compositions.

In another embodiment of this invention, linseed oil is added to a solution of rubber chloride in toluol or in solvent naphtha. To this solution is added 100 parts by weight of linseed oil for every 100 parts of rubber chloride. Linseed oil is readily soluble in toluol. The solution, if necessary, is thinned somewhat by addition of a little toluol and is then treated with decolorizing carbon, etc., and filtered. The filtered liquid can be thinned to give varnishes which dry, not only by evaporation of solvent, but by oxidation; the oxidation being of the linseed oil component. Composite varnish films of useful and attractive properties are obtained. Or most of the solvent may be evaporated off, leaving a thick mass which can be used as a plastic or in roller coating methods. The dried material containing linseed oil may be baked in ordinary ways to improve and harden the oil component. One advantage of this process is that drying oils themselves often contain hygroscopic bodies which form weak points in dried films. By treating a mixed solution of rubber chloride and linseed oil to remove the haze, a better product is obtained than if the oil be added after the clarifying step. Instead of linseed oil, perilla oil, soy bean oil and other drying oils may be used.

A small addition of fatty oil to the varnish base is an aid in obtaining non-brittle dried films; the fatty oil acts as a plasticizer. Castor oil is convenient for this purpose. Where castor oil and rubber chloride are simultaneously treated to remove haze, the cheaper commercial, off-color castor oil grades may be employed, because of the decolorizing action exercised by the carbon.

In making solutions which can be clarified and are adapted for use as varnishes, it is, as stated, desirable to use a balanced solvent. Some of this solvent can be used to dissolve the rubber chloride to a thinness adapted for clarification and the rest of the solvent added later, to the filtered liquid. One such balanced solvent mixture contains the following in parts by weight: toluol, 1530; xylol, 1750; solvent naphtha ("Hi-Flash" naphtha), 1200; decahydronaphthalene (Decalin), 150, and paramethyl-isopropylbenzene (p. cymene), 120. In using such a mixture of solvents for making varnish, clarification may be effected with the rubber chloride dissolved in one or more of the stated solvents, the rest of the mixture being effected after filtration. Into such a liquid may be incorporated as a plasticizer 500 parts by weight of tricresyl phosphate and 100 parts of the butyl ether of ethylene glycol stearate. Tricresyl phosphate, while an excellent plasticizer for most purposes, is somewhat incompatible with the rubber chloride, but the presence of a little of the butyl cellosolve stearate enables the employment of considerable amounts of tricresyl phosphate without difficulty from this source.

In using a liquid containing the bodies stated in the proportions stated, there can be dissolved 1650 parts by weight of commercial, dried "popcorn type" rubber chloride in 5350 parts by weight of mixed liquid. The solution is well stirred for a sufficiently long time to make it homogeneous. Sometimes, 45 minutes stirring are required. The liquid so obtained contains 23.6 per cent rubber chloride and is fluid and mobile enough to permit collection and removal of the haze forming solids.

After the addition of 16.5 parts by weight of commercial decolorizing carbon, heating, agitating and filtering, a bright, translucent filtrate is obtained.

Comparative tests with such a clarified mixture and with a similar unclarified mixture, using dried films immersed in water, give the following results:

| Time of immersion | Clarified | Unclarified |
|---|---|---|
| 15 minutes | Very faint bluish haze | Faint haze. |
| 1 hour | Faint bluish haze | Heavy haze. |
| 4 hours | Translucent bluish haze | Gary-white dense fog. |
| 24 hours | do | Gray-white very dense opaque fog. |

In these results, the plasticizer is regarded as responsible for the bluish haze; free plasticizer taking up traces of water. In a similar accelerated test using films on metal immersed in strong hydrochloric acid (35 per cent HCl), the results were:

| Coating from— | Time for failure | Type of failure |
|---|---|---|
|  | Hours |  |
| Original liquid | 4 | Metal more or less uniformly attacked over most of surface immersed. |
| Clarified liquid | 24 | Metal attacked in a few isolated spots, remainder of immersed surface intact. |

In obtaining these results, aluminum rods were sanded to smoothness and coated by dipping and drying. Three consecutive coatings were used with a 24-hour pause between the several coats to give good drying. In order to secure uniform results, it was thought best to protect the ends of the rods prior to coating, by a dip in hot, highly chlorinated naphthalene (commercial Halowax #1014).

Such a composition as that given can be diluted to a brushing or spraying consistency. A composition suitable for coating fiber sheets, cloth, paper, sheeted cellulose, cellulose esters, cellulose ethers, regenerated cellulose, etc., by spray gun methods can be obtained by adding 6000 parts by weight of xylol. The coatings, while not tacky, are sufficiently thermoplastic when warmed to enable self-sealing under moderate pressure.

A valuable feature of rubber chloride is its non-inflammability and it is a useful component in fireproofing paints and varnishes. One good fireproof paint is obtained by blending 75 parts by weight of chlorinated naphthalene oil, which is a commercial monochlornaphthalene sold as Halowax #1000, with 200 parts of solid, highly chlorinated naphthalene, a commercial, hard, waxy material called Halowax #1014, using 75 parts of toluol as a blending agent and heating to effect homogenization. This material is used in making the paint, being compounded with the clarified liquid described. In so doing, 35 parts by weight of the mixed chlorinated naphthalenes blended with toluol as described, may be added in 310 parts of the chlorinated liquid described and the mixture ground with pigment. A good pigment and filler for the quantities mentioned is made by using 50 parts red oxide of iron, 40 parts fine ground silica and 40 parts blanc fixe. The whole mixture may be ground in a pebble mill until a uniform paint is obtained. The paint may be thinned to the desired extent by an addition of solvent naphtha.

The dried paint coatings are resistant to fire and are not much affected by heat. In using the paint for metals, better adhesion is secured by incorporating a little synthetic resin in the mixture, say, cumarone-indene resin.

What I claim is:

1. In the manufacture of rubber chloride compositions free of the proteids and other non-rubber solids of natural rubber, the steps which comprise preparing a mobile but hazy solution of commercial rubber chloride in a non-aqueous volatile solvent, said commercial rubber chloride containing said proteids and other water absorbing solids and said solution containing not more than 33 per cent rubber chloride, adding to said solution with agitation between 0.5 to 5 per cent of a dried, finely divided decolorizing carbon, heating the mixture to between 30° to 90° C. while continuing the agitation until the said proteids and other solids are fixed by said decolorizing carbon, filtering the mixture under pressure of 10 to 20 pounds per square inch to separate the added decolorizing carbon together with the solids adsorbed thereby and recovering the clear, mobile solution so obtained.

2. The process of claim 1, wherein said solution of commercial rubber chloride, is a varnish composition and said solvent comprises a mixture of coal tar solvents having dissolved therein minor amounts of plasticizers and other solvents of intermediate boiling points and wherein the volatile solvent is subsequently evaporated from the said filtrate to obtain an improved rubber chloride composition, said composition being a solid body free of water absorbent solids.

3. The process of freeing rubber chloride from moisture absorbing impurities of the character of those occurring in rubber and existing as a fine dispersion therein, which comprises heating the rubber chloride in a dry non-aqueous solution, with a minor amount of dry adsorbent material comprising at least one inert finely divided adsorbent which is non-reactive with the constituents of the solution and selected from the class consisting of decolorizing carbon, charcoal, boneblack, fuller's earth and diatomaceous earth, and thereby collecting said impurities, and thereafter removing the added adsorbent material and the said impurities collected thereby.

4. The process of claim 3, wherein the non-aqueous solution of rubber chloride is preliminarily boiled to lessen its viscosity and remove moisture.

5. The process of claim 3, wherein the non-aqueous solution contains a dissolved plasticizer and light tar oils.

JAMES WALLACE RAYNOLDS.

CERTIFICATE OF CORRECTION.

Patent No. 2,148,832. February 28, 1939.

JAMES WALLACE RAYNOLDS.

It is hereby certified that error appears in the printed specification of the above numbered patent requiring correction as follows: Page 1, first column, line 41, for "charrying" read charring; same page, second column, line 20, for the word "merely" read rarely; line 50, after "with" insert the; page 5, first column, line 22, in the table, third column thereof, for "Gary-white" read Gray-white; and that the said Letters Patent should be read with this correction therein that the same may conform to the record of the case in the Patent Office.

Signed and sealed this 11th day of April, A. D. 1939.

Henry Van Arsdale (Seal)

Acting Commissioner of Patents.